Patented Aug. 13, 1929.

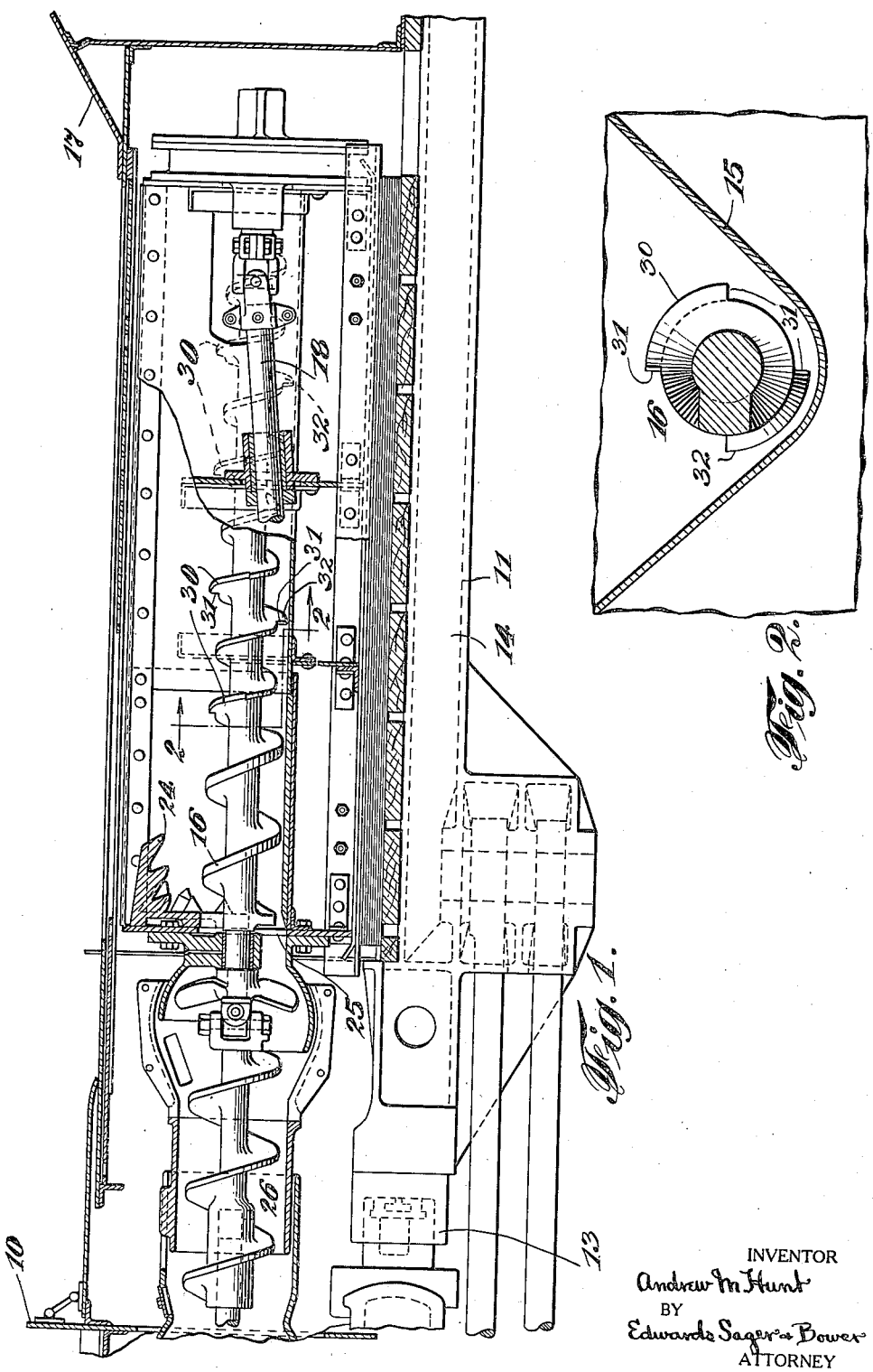

1,724,593

UNITED STATES PATENT OFFICE.

ANDREW M. HUNT, OF NEW YORK, N. Y., ASSIGNOR TO STANDARD STOKER COMPANY, INCORPORATED, A CORPORATION OF DELAWARE.

STOKER CONVEYER.

Application filed January 27, 1925. Serial No. 5,023.

This invention relates to mechanical stokers and particularly to locomotive stokers wherein a screw conveyer is employed to carry the coal forward from the tender to the locomotive.

In stokers of the type where coal drops by gravity from a coal bin into a screw conveyer where it is engaged by the conveyer screw and moved forward, the conveyer screw may not operate effectively on a lump of coal that has a linear dimension greater than the pitch of the screw, because the screw can not get hold of it to move it. The main object of my invention is to improve the construction of the conveyer screw at the points where it receives coal from the bin so that it will effectively engage unusually large, as well as smaller, lumps of coal and move the same.

Other objects and advantages of my invention will appear from the following description taken in connection with the accompanying drawing which shows one embodiment of my invention and wherein Fig. 1 is a side elevation, partly in section, of a conveyer adapted to extend from the locomotive tender to the locomotive fire box.

Fig. 2 is a section on the line 2—2 of Fig. 1.

In the drawing, 10 represents the rear of a locomotive and 11 a portion of a locomotive tender. A coupling gear between the locomotive and tender is indicated at 13 and upon the frame 14 of the tender there is mounted a trough 15 which is in communication with the coal bin 17 of the tender through an opening in the bottom of said bin. The trough 15 contains a rear section 16 of a conveyer screw which is driven by a shaft 18 from a suitable source of power, not shown. Carried at the forward end of the trough 15 is a crusher 24 which is adapted to engage the coal which has been moved forward by the screw and crush and split the same to such size that it may be carried through the opening 25 to the intermediate section 26 of the conveyer. The conveyer screw 16 immediately to the rear of the crusher plate 24 is formed with a thickened flight or thread and to the rear of this thickened portion the thread of the screw is cut away so as to leave series of radially extending segments or projections 30 and 32 which are axially spaced from one another by a distance greater than the pitch of the screw. As shown, the series of projections 30 are in alinement with one another, each projection being spaced two turns from an adjacent projection, and the second series of segments or projections 32 are similarly spaced with reference to one another and angularly displaced from the projections of the first series by 180°.

From the construction shown, it will be seen that the projections 30 and 32 may be said to form a supplementary screw whose engaging portions or flanged extensions are considerably further apart than the engaging faces formed by the continuous portion of the thread of the main screw 16. While the relative positions of the projections may be varied, the projections should be spaced from one another a sufficient distance to enable them to get hold of the larger lumps of coal and give them axial movement. I preferably form the shoulders 31 at the ends of the projections with sharp corners so that these projections will nip the edges of large pieces of coal against the wall of the trough and tend to crack them or bite pieces out. Furthermore, the projections act as cams and will lift a large lump of coal and shift its position so that the screw has a chance to get hold of it and move it axially toward the crusher plate. It is obvious that in certain cases changes in the form of the projections may be resorted to without departing from the spirit of the invention.

I claim:

1. In a stoker, a coal bin having an opening in its bottom, and a conveyer screw adapted to receive coal through said opening, the conveyer screw being formed, adjacent said opening, with projections extending along the screw thread, successive projections being axially spaced from one another a distance equal to a multiple of at least twice the pitch of said screw.

2. In a stoker, a coal bin having an opening in its bottom, a conveyer screw adapted to receive coal through said opening, the conveyer screw being formed, adjacent said opening, with a series of projections, each of which extends along the screw thread and is axially spaced from an adjacent projection of the series by a distance equal to a multiple of the pitch of said screw, and said screw being formed with a second series of similar projections similarly spaced with reference to one another, said second series of projections being angularly displaced with reference to the projections of the first series.

3. In a stoker, a coal bin having an opening in its bottom, a trough adapted to receive coal through said opening, a main conveyer screw in said trough of relatively small capacity and of relatively small diameter and a supplementary conveyer screw formed by additions on the main conveyer screw, said supplementary screw being of relatively large capacity and of relatively large diameter.

4. In a stoker, a coal bin having an opening in its bottom, a trough adapted to receive coal through said opening, a main conveyer screw in said trough of relatively small capacity and of relatively small diameter and an interrupted conveyer screw formed by additions on the main conveyer screw, said interrupted screw being of relatively large capacity and of relatively large diameter.

5. In a stoker, a coal bin having an opening in its bottom, a trough adapted to receive coal through said opening, a main conveyer screw in said trough of relatively small capacity and of relatively small diameter and an interrupted conveyer screw formed by additions on the main conveyer screw, said interrupted screw being of relatively large capacity and of relatively large diameter and having cutting edges whereby large lumps of coal may be caught between said edges and the sides of said trough and broken.

6. In a stoker, a coal bin having an opening in its bottom, a trough adapted to receive coal through said opening, a main conveyer screw in said trough of relatively small capacity and of relatively small diameter, said screw adjacent said opening being extended outwardly to form engaging projections which form a supplementary conveyer screw on said main screw of relatively large capacity and of relatively large diameter.

7. In a stoker, a coal bin having an opening in its bottom, a trough adapted to receive coal through said opening, a main conveyer screw in said trough of relatively small capacity and of relatively small diameter, said screw adjacent said opening being extended outwardly to form engaging projections which form a supplementary conveyer screw on said main screw of relatively large capacity and of relatively large diameter, said first mentioned conveyer screw having a smooth periphery between said engaging projections.

8. In a stoker, the combination of a fuel receptacle or trough, a conveyer screw disposed in said receptacle and extending longitudinally thereof, said screw being rotatable to advance the fuel along the receptacle, the normal thread of the screw being formed at regular intervals with outwardly projecting segments conforming to the thread and providing extensions thereof for engaging with and feeding fuel lying outside the normal thread, the regular spaces between the projecting segments exceeding in length the pitch of the normal thread of the screw so that larger lumps of fuel may be received between and fed by said projecting segments than can be received and fed by adjacent normal threads of the screw.

9. In a stoker, the combination of a fuel receptacle or trough, and a conveyer screw disposed in said receptacle and extending longitudinally thereof, said screw being rotatable to advance the fuel along the receptacle, the normal thread of the screw being formed at regular intervals with outwardly extending segments conforming to the thread and providing segmental fuel-feeding flanges whose outer faces are in curves concentric with the outer face of the normal screw thread, the regular spaces between the projecting segments exceeding in length the pitch of the normal thread of the screw so that larger lumps of fuel may be received between and fed by said projecting segments than can be received and fed by adjacent normal threads of the screw.

10. In a stoker, the combination of a fuel receptacle or trough, and a conveyer screw disposed in said receptacle and extending longitudinally thereof, said screw being rotatable to advance the fuel along the receptacle, the normal thread of the screw being formed at regular intervals with outwardly projecting segments each extending through a quarter turn of the screw and in shape conforming to the normal thread, said segments operating as fuel-feeding devices.

11. In a stoker, the combination of a fuel receptacle or trough, and a conveyer screw disposed in said receptacle and extending longitudinally thereof, said screw being rotatable to advance the fuel along the receptacle, the normal thread of the screw being formed at regular intervals with outwardly projecting segments conforming in shape with the thread and providing segmental fuel-feeding flanges which extend in two series along the screw, the two series being diametrically opposite each other.

12. In a stoker, the combination of a fuel receptacle or trough, and a conveyer screw disposed in said receptacle and extending longitudinally thereof, said screw being rotatable to advance the fuel along the receptacle, the normal thread of the screw being formed at regular intervals with outwardly projecting segments conforming to the thread and providing segmental fuel-feeding flanges each extending substantially through a quarter turn of the screw, said flanges extending in two series along the screw which are diametrically opposite each other, the flanges in each series being on alternating thread portions of the screw so that there is a normal thread portion intervening between each two flanges in a series.

13. In a stoker, the combination of a fuel receptacle or trough, and a conveyer screw disposed in said receptacle and extending longitudinally thereof, said screw being rotatable to advance the fuel along the receptacle, the normal thread of the screw being formed at regular intervals with outwardly projecting segments conforming to the thread and providing segmental fuel-feeding flanges whose outer faces are in curves concentric with the outer face of the normal screw thread, the flanges being connected with the normal thread by radial faces whereby sharp corners are formed.

14. A conveyer screw adapted to be rotatably disposed in a fuel receptacle for advancing fuel therein, comprising a screw having a normal thread formed at regular intervals with outwardly projecting segments conforming to the thread and providing segmental fuel feeding flanges whose outer faces are in curves concentric with the outer face of the normal screw thread, said flanges being connected with the normal thread by substantially radial faces whereby sharp corners are formed.

ANDREW M. HUNT.